April 18, 1961  C. B. BRAHM  2,980,868
FAIL-SAFE MODULATION CIRCUIT
Filed April 7, 1959
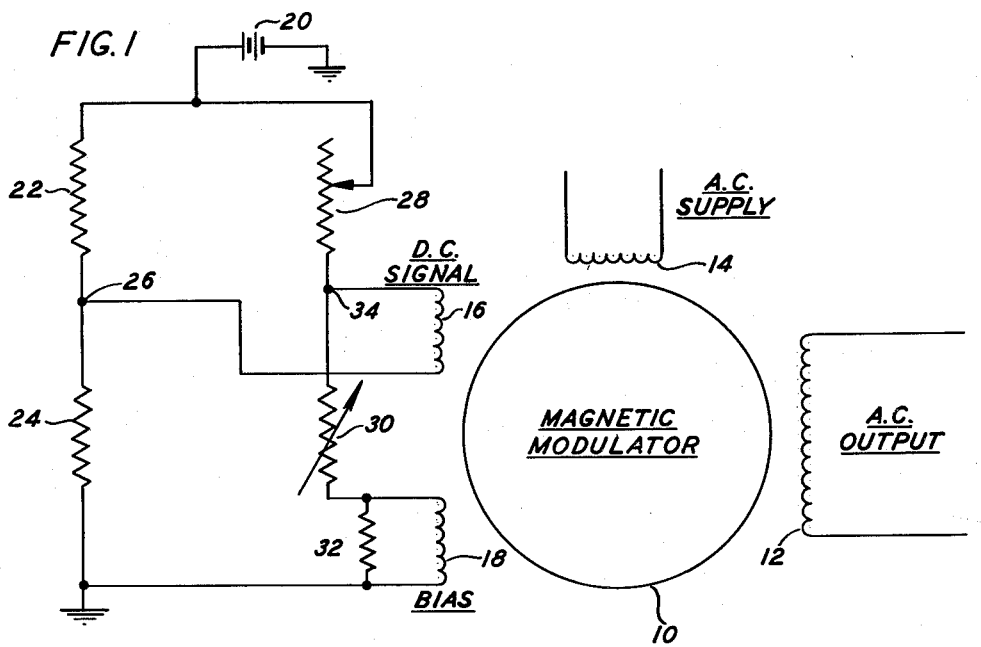
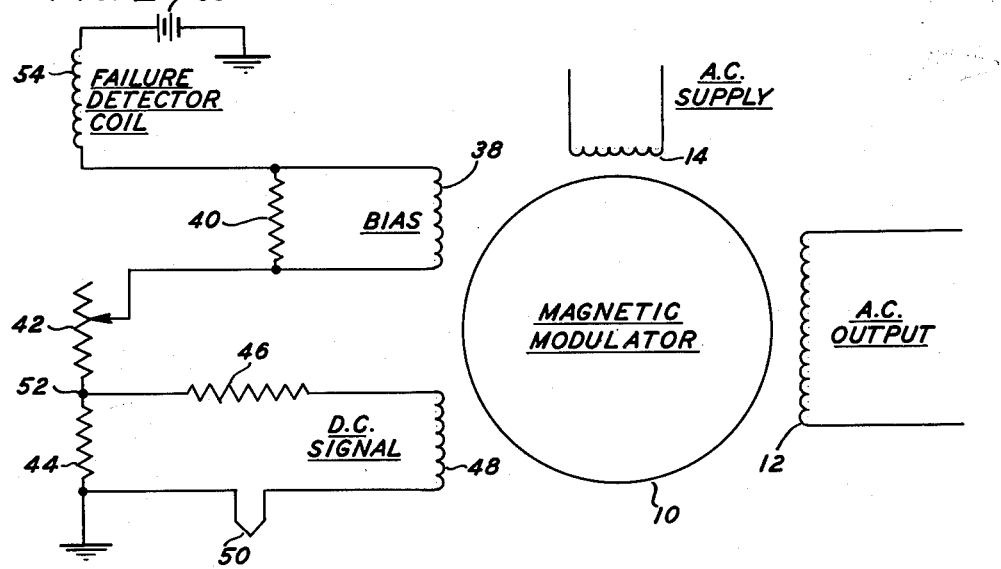
INVENTOR
CHARLES B. BRAHM
BY Harris G. Luther
ATTORNEY

United States Patent Office 2,980,868
Patented Apr. 18, 1961

2,980,868

FAIL-SAFE MODULATION CIRCUIT

Charles B. Brahm, Rockville, Conn., assignor to United Aircraft Corporation, East Hartford, Conn., a corporation of Delaware Filed Apr. 7, 1959, Ser. No. 804,799

13 Claims. (Cl. 332—51)

This invention relates to magnetic modulators, and more particularly to a circuit arrangement which will render the magnetic modulator inoperative in the event of certain failures in the modulator control circuit.

A well-known method of converting a varying D.C. control signal into an amplitude modulated A.C. signal is by use of a magnetic modulator. The D.C. signal is fed to the modulator on one winding, called the signal or control winding, while a constant amplitude A.C. signal of preselected frequency is fed to the modulator on another winding commonly called the exciter winding. The resultant modulated A.C. signal is sensed by an output winding and can be amplified or utilized as necessary. Some magnetic modulators also require an additional winding called a bias winding in which a constant D.C. current biases the magnetic material of the modulator to a preselected operating point on its hysteresis loop.

In systems such as those for sensing temperature variations, it is common to employ a D.C. bridge circuit for producing the control or error signal. A device such as a thermistor, in which the resistance of the element varies with temperature, is utilized as one leg of the bridge circuit. A pair of fixed resistors commonly form one side of the bridge circuit while the other side of the bridge includes the thermistor and a manually variable resistor. A modulator signal winding is connected across the bridge circuit. A source of D.C. voltage supplies a reference voltage to the bridge. When the temperature of the system is at the desired value, the bridge is balanced and no potential difference exists across the control winding. However, if the temperature of the system is not at the desired value, the change in resistance of the thermistor will unbalance the bridge circuit causing a potential difference and a flow of current across the control winding. The manually adjustable resistor is used to vary the null point or the point at which the bridge is balanced. Any resulting error signal caused by the unbalancing of the bridge will be sensed by the modulator and will cause a change in the A.C. output signal.

A difficulty encountered in practice with the bridge circuit for producing the error signal is the fact that a failure, particularly an open circuit in the temperature sensor, will result in a radical change in the error signal across the control winding. If the system is a control or feedback type system, in which variations of temperature are sensed and action is taken by the system to correct the temperature variations, the extreme signal caused by the circuit failure will result in an undesirable and perhaps damaging reaction by the system.

The present invention uses a modified bridge circuit arrangement in conjunction with a magnetic modulator which requires a bias winding to overcome the difficulties mentioned.

It is, therefore, an object of the invention to provide a magnetic modulator control circuit which will render the modulator inoperative upon a failure in the control circuit.

Another object of this invention is to provide in a magnetic modulator a control circuit which will render the magnetic modulator inoperative upon an open circuit in the error sensor regardless of the control signal produced by such failure.

A further object of this invention is to provide in a magnetic modulator a control circuit in which an open circuit in the error sensor will result in the loss of the bias signal.

A still further object of this invention is a magnetic modulator control circuit in which a loss of the reference signal will result in loss of the bias signal, thereby rendering the modulator inoperative.

These and other objects and a fuller understanding of the invention may be had by referring to the following description and claims taken in conjunction with the following drawings in which:

Fig. 1 shows a magnetic modulator control circuit which incorporates the invention and;

Fig. 2 shows a modification of the circuitry of Fig. 1.

A standard magnetic modulator 10 is illustrated in Fig. 1, having an A.C. output winding 12 which senses the modulated signal, an A.C. supply or exciter winding 14 which provides a constant amplitude A.C. signal, and a D.C. signal or control winding 16 which supplies the error signal. A D.C. bias winding 18 is also provided, its function being to fix the position on the hysteresis curve about which the variations take place to some value other than zero.

A source of D.C. voltage, such as battery 20, provides through fixed resistors 22 and 24 which comprise one side of a bridge circuit, a fixed reference potential at junction 26. The other side of the bridge includes in series a variable resistor 28, a temperature sensitive element whose resistance varies with temperature such as thermistor 30, and bias winding 18 across which is a small voltage dropping resistor 32. The D.C. signal winding 16 is placed across the bridge between junctions 26 and 34. The circuit elements are chosen so that at a preselected temperature, thermistor 30 will have a resistance such that junction 34 will be at the same potential as junction 26, and no current will flow through signal winding 16. Any change in temperature will change the resistance of thermistor 30, thus unbalancing the bridge and causing a current flow through winding 16 with magnitude and direction indicative of the temperature variations. Variable resistor 28 can be a rheostat used to adjust the null point to a desired temperature.

It will be noted that by inserting bias winding 18 in series with thermistor 30, an open circuit in the thermistor will result in no bias current, and no output will result from modulator 10. During normal operating conditions a relatively constant current will flow through bias winding 18.

Fig. 2 illustrates a modification of the circuit of Fig. 1 for use with a different temperature sensitive device. D.C. voltage supply 36 provides the current for bias winding 38 with its voltage dropping resistor 40, and also for variable resistance element 42 and the parallel combination of resistor 44 with resistor 46, D.C. signal winding 48 and thermocouple 50. Battery 36 provides a relatively constant potential to junction 52. Thermocouple 50 can be considered a source of D.C. potential, so that when the temperature of the system is such that the potential generated by thermocouple 50 equals the potential across resistor 44, no difference in potential exists across and thus no current flows through signal winding 48. Variable resistor 42 can be adjusted to vary the potential at junction 52 and change the preselected temperature. When the temperature is above or below the preselected value, thermocouple 50 will generate a voltage different from that at junction 52 and current will then flow through winding 48 with magnitude and direction indicative of the temperature change. In this circuit, the loss of supply voltage or failure or opening of any element in the series circuit will result in loss of bias current. A failure or open circuit in the signal winding circuit 48 will result in loss of the signal. In either case no output will result from modulator 10, and the system is thus protected.

It may sometimes be desirable to provide a failure sensing means along with the fail-safe circuit, so that corrective action can be taken when failure occurs. Fig. 2 shows how a failure detector coil 54 can be placed in series with the voltage source 36 so that a failure results in loss of output from modulator 10 and a failure indicator, not shown, will indicate the loss of the voltage. If a voltage reference, as distinguished from a current reference, is provided, the bias winding and failure detector can be placed in series across the voltage reference.

The failure indicator can be any device which provides an indication of the presence or absence of electrical current or voltage. Thus, meters, relays or lights operated by transistors or magnetic amplifiers can be used for the failure indicator. In Fig. 2, coil 54 can be that of a meter to indicate the presence or absence of the reference voltage.

What has thus been described is a fail-safe circuit which will prevent a failure or open circuit in a circuit element from adversely affecting the output of a magnetic modulator. While the invention has been described as being responsive to temperature, it is to be understood that any equivalent circuit responsive to other conditions of operation can be used with the same results.

Although the invention has been described in its preferred form with a certain degree of particularity, numerous changes in the details of construction and the combination and arrangement of parts may be made without departing from the spirit and scope of the invention.

I claim:

1. A magnetic modulator having an output winding, a supply voltage winding, a bias winding and a signal winding, a source of voltage supplying current to said bias winding and supplying a reference voltage for said signal winding, error signal producing means for varying the voltage drop across said signal winding in response to varying operating conditions, and means connecting said error signal producing means with said signal winding and said bias winding for rendering said magnetic modulator inoperative upon failure of said error signal producing means.

2. In a magnetic modulator, a source of voltage, a bridge circuit connected with said voltage source and having a pair of fixed impedances in series on one side of said bridge and a resistor and an error sensor in series on the other side of said bridge, a signal winding responsive to variations of said error sensor connected across said bridge between the junction of said fixed impedances on one side and the junction of said resistor and said error sensor on the other side, and a bias winding in series with said error sensor, said bias winding being disconnected from said voltage source and said magnetic modulator being rendered inoperative upon failure of said error sensor.

3. In a magnetic modulator first and second voltage dividers connected with said voltage source, a source of voltage, said first voltage divider comprising a pair of fixed impedances, said second voltage divider comprising a resistor and an error sensor, a signal winding responsive to variations of said error sensor connected between said voltage dividers, and a bias winding in series with said error sensor, said bias winding being disconnected from said voltage source and said magnetic modulator being rendered inoperative upon failure of said error sensor.

4. A magnetic modulator as in claim 3 where the said resistor is variable for adjusting the response of said signal winding.

5. In a magnetic modulator requiring a bias signal, means including an error senor for supplying an input signal to said modulator, means for supplying a bias signal to said modulator, and means connecting said error sensor with said bias signal supply means including means to render said bias signal supply means ineffective and to render said magnetic modulator inoperative upon failure of said error sensor.

6. In a magnetic modulator as in claim 5 where said connecting means includes a series connection.

7. A magnetic modulator having a supply voltage winding, an output winding, a bias winding and an input winding, means including a source of voltage for supplying current to said bias winding, and means including an error sensor connected in series with said bias winding to eliminate said bias signal and render said magnetic modulator inoperative upon failure of said error sensor.

8. In a magnetic modulator having a source of voltage, a bridge circuit connected with said voltage source and having a bias signal supplied through one leg of said bridge circuit, a signal winding connected across said bridge circuit, and an error sensor for producing signal variations across said signal winding, means including a series connection to render said bias ineffective upon failure of said error sensor.

9. In a magnetic modulator requiring a bias signal, a control circuit having a bias winding and a signal winding, a source of voltage supplying current to said bias winding and supplying a reference voltage for said signal winding, an error sensor connected with said signal winding to provide variations in the voltage across said signal winding, and means including said connection for rendering said magnetic modulator inoperative upon failure of said error sensor.

10. A magnetic modulator as in claim 9 in which a variable resistor is connected in series with said voltage source to vary said reference voltage.

11. A magnetic modulator as in claim 10 in which a failure detector is inserted in series with the bias winding and the reference voltage for determining the occurrence of a failure in the circuit.

12. In combination, a magnetic modulator having an output winding and a supply voltage winding, means to supply an input signal to said magnetic modulator and means connected with said input signal supply means to supply a bias signal to said magnetic modulator, said bias signal supply means being rendered ineffective upon failure of said input signal supply means.

13. In a magnetic modulator, having a signal winding and a bias winding, error signal producing means connected with said windings and providing said signal winding with error signals, said means being connected in series with one of said windings and rendering said modulator inoperative upon failure of said means.

References Cited in the file of this patent

UNITED STATES PATENTS

| | | |
|---|---|---|
| 1,979,311 | Borden | Nov. 6, 1934 |
| 2,164,383 | Burton | July 4, 1939 |
| 2,854,633 | De Jagar | Sept. 30, 1958 |